United States Patent [19]

Stone

[11] Patent Number: 4,482,097

[45] Date of Patent: Nov. 13, 1984

[54] ROTARY APPARATUS HAVING IMPROVED DRIVE MEANS

[75] Inventor: Alan M. Stone, Greensborough, Australia

[73] Assignee: Bechtel International Corporation, San Francisco, Calif.

[21] Appl. No.: 404,023

[22] Filed: Aug. 2, 1982

[30] Foreign Application Priority Data

Aug. 17, 1981 [AU] Australia ............................. PF0275

[51] Int. Cl.³ .............................................. B02C 17/24
[52] U.S. Cl. .................................. 241/101.2; 241/178
[58] Field of Search .................. 241/176, 101.1, 101.2, 241/178; 366/60, 61, 220, 233; 310/40 R, 66

[56] References Cited

FOREIGN PATENT DOCUMENTS 400359  7/1974  U.S.S.R. ............................. 241/176

Primary Examiner—Mark Rosenbaum
Assistant Examiner—Joseph M. Gorski

Attorney, Agent, or Firm—Townsend & Townsend

[57] ABSTRACT

A rotary apparatus, such as an ore grinding mill, has a wrap-around drive motor secured thereto for rotating the apparatus about a central axis. The drive motor includes a rotor attached to and surrounding the apparatus and a stator surrounding and spaced from the rotor and coupled to the apparatus by anti-friction or journal bearings. Thus, the rotor can rotate relative to the stator yet the stator is supported by the apparatus and the gap between the rotor and stator is maintained substantially uniform at all circumferential locations along the rotor. The journal bearings include a number of wheels or rollers mounted on an annular carrier for the stator and engaging an annular track on the apparatus. The stator has a pair of legs for coupling the stator to a fixed support to prevent rotation of the stator about the central axis relative to the support yet permit small lateral displacements of the stator with the apparatus relative to the axis support.

30 Claims, 6 Drawing Figures

ROTARY APPARATUS HAVING IMPROVED DRIVE MEANS

BACKGROUND OF THE INVENTION

In a massive rotary apparatus, such as a rotary mill for grinding ore, a powerful drive system is necessary to initiate and maintain rotation of the apparatus. Starting torques for an apparatus of this type are extremely high. For instance, in autogenous or semi-autogenous mills used for grinding mineral bearing ores and in other large rotary mills such as ball mills, rod mills and cement mills, a rotary mill or drum may have a diameter of the order of 28 to 36 feet and may weigh as much as 1,000 tons. Typically, a mill of this size requires a drive motor having a power output of 10,000 horsepower and above.

In conventional drive systems for mills of this type, power is generally delivered to the mill for rotating the mill about a central axis. This power is delivered to the mill by way of several pinion gears coupled to at least one ring gear connected to the mill. As the mill rotates, the charge in the mill is in the form of a slurry of ore, water and grinding media which tumbles inside the mill and cascades against the inner wear surface portions of the mill. This tumbling action causes the ore to be broken into small pieces and finally reduced in size so that the ore can be taken out of the mill and transported to other areas for further processing.

As the slurried ore and grinding media are tumbled in the mill, tremendous reaction forces are generated which cause the structure of the mill to deform and to be displaced in all directions. This requires the mill itself to be constructed so that it can withstand such large forces which would otherwise seriously limit the operating life of the mill to a relatively short period of time.

It is generally known that gears used with a mill of this type can fail in a relatively short time due to pitting and alignment problems. The gears must be frequently maintained and this requires the mill to be shut down. Thus, the throughput of the mill is correspondingly reduced.

To avoid the use of gears, mills of massive size and inertia have been provided with wrap-around drive means comprised of an electric motor having an annular rotor and an annular stator surrounding the rotor. The rotor itself is coupled in some fashion to the main body of the mill while the stator is fixed to and supported from a means adjacent to the mill. Thus, when the drive means is energized, the mill is rotated in response to the rotation of the rotor relative to the stator. Disclosures relating to a drive means of the wrap-around type are found in the following references: Australian Patent No. 476142; U.S. Pat. No. 1,674,516; German Patent No. 537177; Australian Patent No. 291973; Australian Patent No. 264545; and U.S. Pat. No. 3,272,444.

In all of the foregoing disclosures, there is no adequate means of keeping a substantially uniform air gap between the rotor and the stator of a wrap around motor for a massive rotary mill. Thus, a wrap-around motor for a mill of this size cannot provide that there will be no localized heating of the rotor and stator due to the distortion of the rotor and the mill without distortion of the stator because of the independent support for the stator. As a result, the motor cannot continuously provide the power necessary to drive the mill in an economical manner as a substantially uniform gap is mandatory to maintain the required electrical field.

These problems present a significant drawback with such wrap-around motors as applied to massive structures, such as an ore grinding mill of the type described. The problems arise because the aforesaid driving and reaction forces on such a large mill often cause vibrations and distortion of the mill. As a result, the operating of the wrap-around motor is adversely affected because the rotor of the motor can move toward or away from its stator and change the density of the magnetic flux across the gap between the rotor and stator. This change in magnetic flux density causes unequal torques to be exerted on the mill at different locations thereon. Such unequal torques inhibit the continuous rotation of the mill. The problems further create considerable expense due to the wear and tear on the mill and require continuous maintenance and replacement of parts.

A need therefore exists for improvements in wrap-around motors which avoids the aforesaid problems. The present invention fills this need.

SUMMARY OF THE INVENTION

The present invention provides a rotary apparatus with an improved wrap-around drive means therefor wherein the drive means comprises an electric motor having a rotor secured to the apparatus itself, a stator surrounding the rotor and properly secured against rotation to a fixed support, and anti-friction or journal bearing means coupling the stator and apparatus together in a manner to permit the stator to be supported on the apparatus and to maintain a uniform gap between the rotor and stator while allowing the rotor to rotate relative to the stator. To this end, the bearing means between the rotor and stator comprises wheels or rollers movable in rolling relationship to an annular bearing surface, such as a track. The wheels or rollers can be coupled either to the stator or to the apparatus. The annular bearing surface is carried by the structure which does not carry the wheels or rollers. In a preferred embodiment, an annular carrier for the stator has means for rotatably mounting a plurality of pairs of wheels or rollers in a manner such that the wheels or rollers of each pair engage a pair of side-by-side annular tracks or surfaces on the apparatus.

The bearing means keeps the rotor substantially concentric at all times to the stator and uniformly spaced therefrom, yet the bearing means is at the sides of the rotor and stator so that the bearing means does not interfere with the magnetic flux in the gap between the rotor and stator. Thus, the efficient operation of the motor defined by the rotor and stator is not affected by the bearing means so that large starting torques can be readily provided by the motor for the rotary apparatus itself and the apparatus can be kept in rotation by continuous operation of the motor.

The motor may be a linear induction motor or synchronous motor. However, other types of motor having an annular rotor and an annular stator can be used to carry out the teachings of the present invention.

Another important feature of the present invention is the manner in which the stator is restrained to prevent rotation of the stator as the rotor rotates. The stator has a yieldable restraining means in the form of a rigid leg which keeps the stator secured to a fixed support, such as a support surface on which the apparatus is mounted. The leg has a resilient anchor to permit small displacements to the stator both laterally and radially of the axis of rotation of the apparatus in response to lateral, radial and vibratory movements and structural distortion of the apparatus as a result of the grinding of ore and other materials therewithin. The anchor is of resilient material so as to be yieldable slightly longitudinally of the restraining arm to avoid structural damage to the rotor and stator due to lateral, radial and other vibratory movements and structural distortion of the apparatus during its operation.

While the teachings of the present invention are particularly suitable for use with a rotary ore grinding mill, they can also be used with other types of rotary structures. In the case of a rotary mill, the mill itself has a hollow casing with a generally cylindrical outer peripheral surface and the rotor may be connected directly to such surface or coupled to one end thereof or to a trunnion by tubular structure, such as a torque tube. If a torque tube is used, an annular, bell housing or spoked structure may be provided between the rotor and the casing to support the weight of the motor near the outer end of the torque tube.

The primary object of the present invention is to provide a rotary apparatus having improved wrap-around drive means thereon wherein the drive means comprises an electric motor having an annular rotor coupled to the apparatus, an annular stator surrounding the rotor, and anti-friction bearing means supporting the stator on the apparatus while the stator is kept from rotating with the rotor so that the gap between the rotor and stator will be kept substantially uniform at all times to assure that the motor operates properly notwithstanding lateral, radial and vibratory movements and structural distortions of the rotary apparatus during operation of the motor.

Another object of the present invention is to provide a rotary mill which is relatively massive in size and which has a wrap-around drive motor coupled thereto with the drive motor having a rotor and stator coupled by journal bearings to support the stator on the mill and to keep the gap between the rotor and stator substantially uniform throughout its circumferential length to thereby assure proper operation of the motor notwithstanding lateral, radial and vibratory movements or structural distortion of the rotary mill itself.

A further object of this invention is to provide a wrap-around electric motor of the type described which is especially suitable for massive rotatable structures, such as rotary ore grinding mills, so that substantially continuous operation of such a structure over long periods of time can be achieved at minimum cost and with a minimum of maintenance.

Other objects of this invention will become apparent as the following specification progresses, reference being had to the accompanying drawings for an illustration of the invention.

Figure 1:
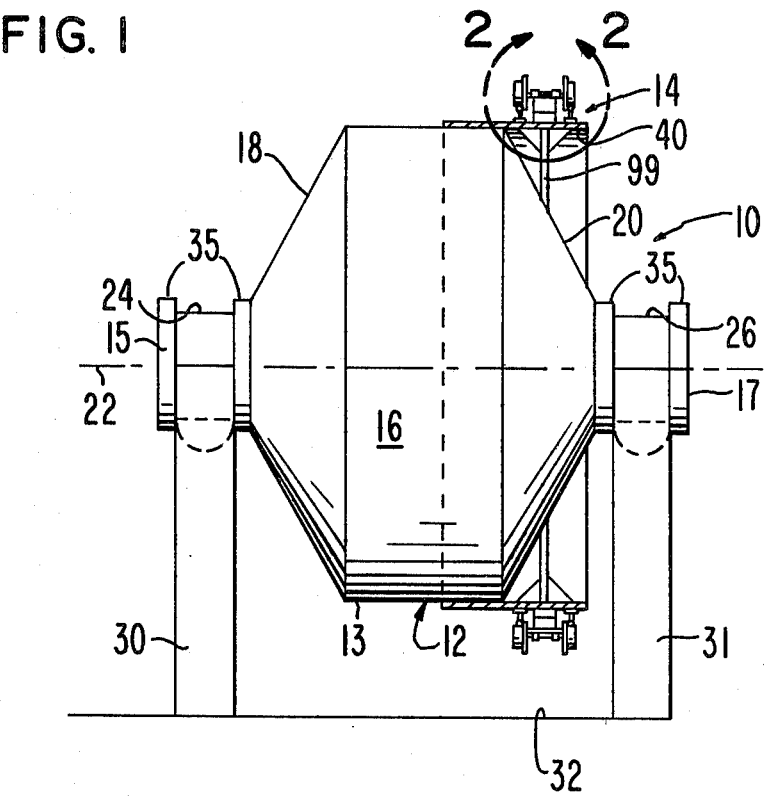
FIG. 1 is a side elevational view of a rotary apparatus having an improved wrap-around drive means mounted thereon, the drive means being cut away to show details of construction.

The rotary apparatus of the present invention is broadly denoted in FIG. 1 by the numeral 10 and includes a rotary body 12 having a wrap-around drive means 14 coupled thereto. The drive means comprises an electric motor which will be set forth in detail hereinafter. For purposes of illustration, rotary apparatus 10 comprises an ore-grinding mill, and body 12 of the mill is hollow and is adapted to receive ore to be ground through open end 15 thereof. The ground ore leaves body 12 through the opposite open end 17 thereof.

Figure 4:
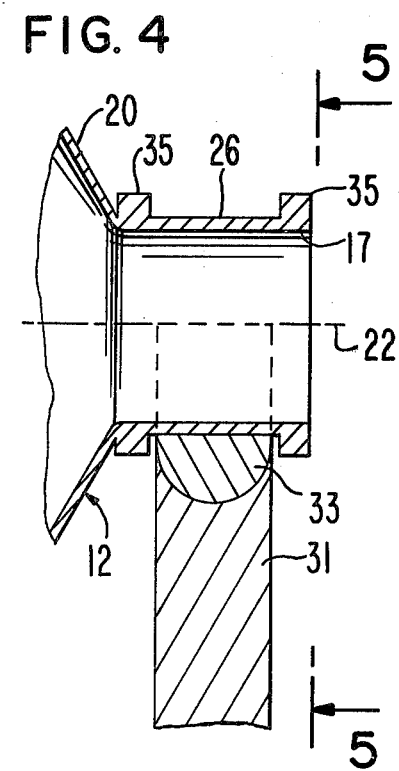
FIG. 4 is an enlarged, fragmentary schematic view of one end of the apparatus of FIG. 1, showing a portion of a pedestal therefor.
Figure 5:
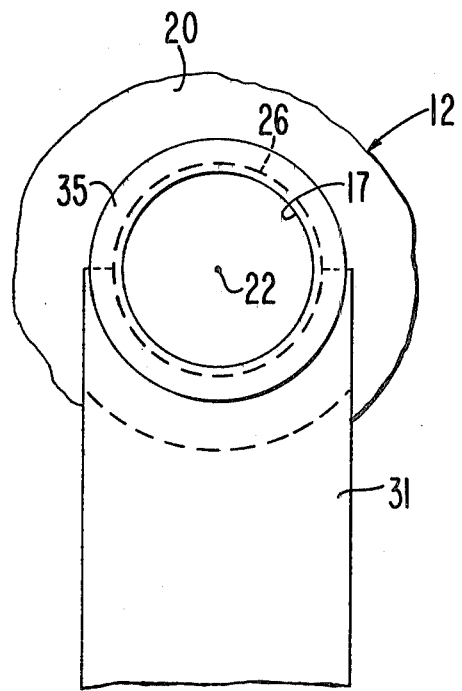
FIG. 5 is an end elevational view looking in the direction of line 5—5 of FIG. 4.

Body 12 includes a central, cylindrical member 13 having a cylindrical outer surface 16. A pair of conical end walls 18 and 20 are coupled to the opposed ends of member 13 and project outwardly therefrom concentric with a central, generally horizontal axis 22 about which body 12 rotates. Body 12 further includes a pair of flanged, cylindrical end bearing housings 24 and 26 (FIG. 4) secured to respective end walls 18 and 20 and supported by upright pedestals 30 and 31, respectively, on a support surface 32 therebelow. Each pedestal typically has a bearing member 33 (FIG. 4) provided with a spherical outer surface and adapted to rotatably engage the corresponding end bearing housing between the spaced flanges 35 thereof.

Motor 14 is shown in FIG. 1 as being near end wall 20 in surrounding relationship to this end wall. Motor 14 includes an annular rotor 34 (FIG. 2) secured by legs 36 to the outer surface 38 of a torque tube 40 which is concentric with axis 22 (FIG. 1) and is secured near one end thereof in any suitable manner to the outer surface 16 of central, cylindrical member 13 as shown in FIG. 1. Thus, rotor 34 and tube 40 are secured to and rotate with housing 12 about axis 22. Rotor 34 has conductors 44 (FIG. 2) which lead to a source of electrical power. In lieu of torque tube 40, rotor 34 could be secured directly to central member 13 or to an extension to bearing housing 26.

An annular stator 46 having electrical conductors 48 surrounds rotor 34 and is spaced therefrom to form a gap 50 (FIG. 2) between the rotor and stator. Stator 46 is secured by legs 52 (FIG. 2) to an annular carrier 54 which is concentric with axis 22. Carrier 54 is a rigid tube of high strength material which surrounds rotor 34 and stator 46 and is secured against rotation to a fixed support, such as support surface 32, in any suitable manner. To this end, carrier 54 has a pair of laterally projecting lugs or wings 56 and 58 (FIG. 3) at diametrically opposed locations on the carrier, specifically on a generally horizontal line perpendicular to axis 22. Wings 56 and 58 are pivotally secured by pins 62 and 64, respectively, to the upper ends of a pair of rigid restraining legs 66 and 68. The lower ends of legs 66 and 68 are secured by yieldable attachment anchors 70 and 72, respectively, to support surface 32.

Each of attachment anchors 70 and 72 comprises a crossbar 74 rigidly secured to the lower end of the corresponding leg 66 or 68. The ends of crossbar 74 are secured to surface 32 by resilient suspension blocks 76 and 78. Blocks 76 and 78 may be pre-compressed by adjustable clamps to adjust their spring rates. Thus, as is clear in FIG. 3, stator 46, while fixed to surface 32, can be displaced laterally of axis 22, i.e., from left to right or from right to left when viewing FIG. 3, as a result of the rotation of housing 12 about axis 22 yet legs 66 and 68 prevent upward or rotational movement of stator 46 relative to support surface 32 therebelow.

Figure 2:
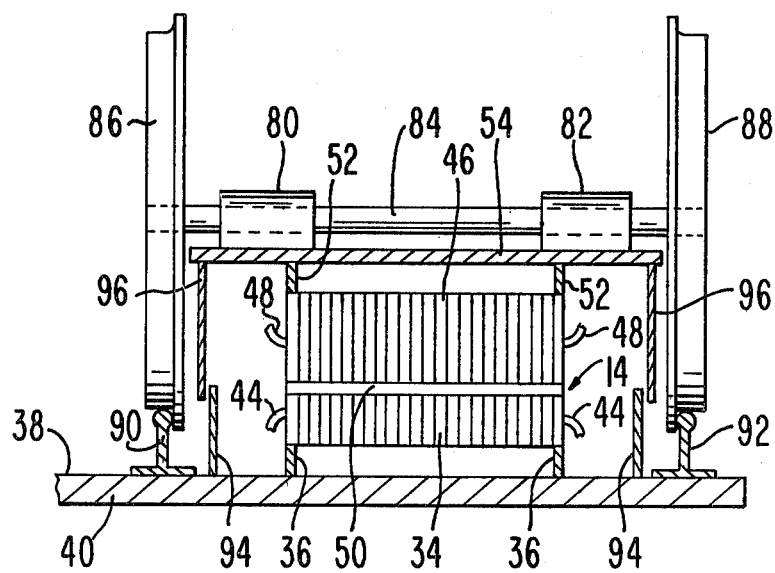
FIG. 2 is an enlarged, fragmentary cross-sectional view of the drive means looking in the direction of line 2—2 of FIG. 1, showing a first embodiment of anti-friction or journal bearings forming parts of the drive means.
Figure 3:
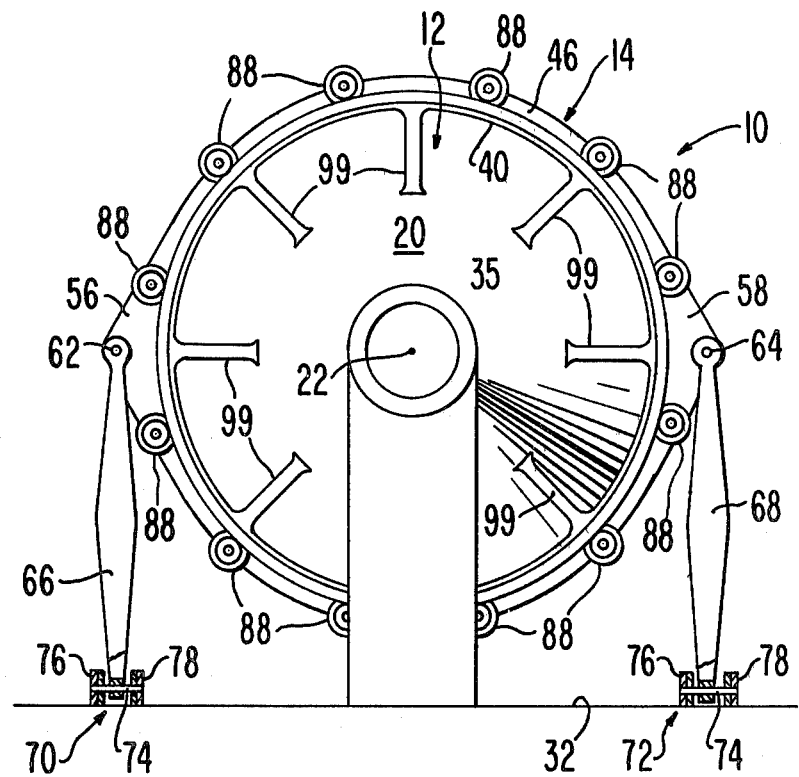
FIG. 3 is an end elevational view of the apparatus of FIG. 1.

As shown in FIG. 2, carrier 54 for stator 46 has a number of pairs of axially spaced sleeves or bushings 80 and 82 secured to the outer periphery of the carrier at spaced, circumferential locations thereon. Each pair of sleeves 80 and 82 rotatably mounts a shaft 84 having flanged wheels 86 and 88 at the outer ends thereof. The wheels are in rolling relationship to a pair of spaced, annular tracks 90 and 92 rigidly secured in any suitable manner to the outer periphery of torque tube 40 as shown in FIG. 2. Thus, tracks 90 and 92 rotate with rotor 34 and tube 40 relative to stator 46 when motor 14 is energized. The wheels 86 and 88, when they engage the tracks, define anti-friction or journal bearings which rotatably support the stator in proper relationship to the rotor.

A dust seal is provided for motor 14 at each side, respectively, of the rotor to prevent dust and dirt from entering the region occupied by the rotor and the stator. This dust seal comprises a pair of adjacent, generally flexible or resilient, annular panels 94 and 96 adjacent to each of the rails 90 and 92, respectively. Panel 94 is secured to and extends outwardly from the outer periphery of torque tube 40, and panel 96 is secured to and extends inwardly from the inner periphery of carrier 54. Panels 94 and 96 substantially overlap each other and are generally in sliding relationship to each other.

Figure 6:
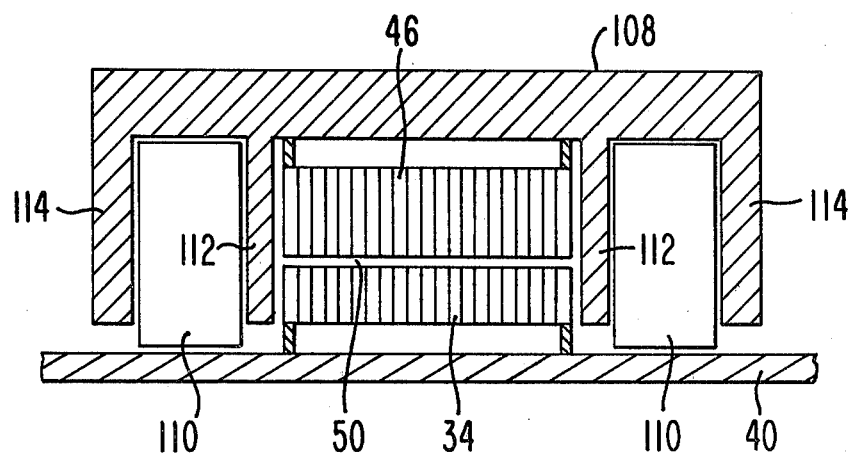
FIG. 6 is a view similar to FIG. 2 but showing another embodiment of the journal bearings of the drive means.

FIG. 6 shows another embodiment of the anti-friction or journal bearings rotatably mounting the stator in close proximity to the rotor. In this embodiment, rotor 34 is adjacent to stator 46 to form gap 50 therebetween and the rotor is on torque tube 40 secured to body 12 as described above. Stator 46 is carried by an annular cage structure 108, and a number of cylindrical rollers 110 are in free rolling relationship to the annular outer surface 38 of torque tube 40 and to the annular, inner surface portions 109 of the cage structure 108. Rollers 110 are rotatably confined between sides 112 and 114 of cage structure 108. In lieu of using free rollers as shown in FIG. 6, the rollers can be mounted on shafts attached to one or both sides 112 and 114.

In the operation of apparatus 10, the ore to be ground is fed continuously into body 12 through open end 15 thereof. For a continuous feed, the motor is preferably energized before the feed is commenced. Energizing the motor causes a magnetic field to be created across gap 50 between rotor 34 and stator 46, and this magnetic field generates magnetic forces which cause the rotor to rotate relative to the stator. As the rotor rotates, torque tube 40 also rotates, as does rotary body 12, about axis 22. During rotation of body 12, the ore therein is ground to the desired consistency, and the ground ore is removed from body 12 through end 17 thereof.

The journal bearings coupling the stator to the rotor keep gap 50 substantially uniform throughout its circumferential extent. Thus, the torque applied by motor 14 to body 12 is exerted on the body substantially uniformly throughout the entire circumferential extent of central member 13 by virtue of the connection of torque tube 40 to the outer surface 16 of member 13. As a result, there are no large, localized driving forces exerted on body 12 which would otherwise inhibit the desirably continuous, substantially constant speed rotation of body 12. To stiffen the torque tube 40, a number of spokes 99 (FIG. 3) are coupled between the inner peripheral surface of torque tube 40 and the outer, conical surface of end wall 20.

The restraining legs 66 and 68 (FIG. 3) of stator 46 operate to prevent rotation of the stator during operation of motor 14 but allow the stator to be displaced laterally of axis 22 through small distances in response to vibratory movements and structural distortion of body 12. Such movements and distortion are significant because of the massiveness of rotary body 12 and the materials moving about within the body. If the stator were installed on fixed, rigid mountings, it would not be possible to keep gap 50 uniform throughout its circumferential extent of the gap. With the journal bearings coupling the rotor and stator and with legs 66 and 68 preventing rotation of the stator relative to the rotor, it is possible to keep gap 50 substantially uniform at all locations along its circumferential length.

Stator carrier 54 (FIG. 2) has been described as being rigid. However, it could be made a pivotally interconnected segments to more efficiently compensate for structural distortion of the mill. If segmented, stator carrier 54 would preferably have the journal bearing wheels 86 and 88 at the junction of adjacent segments.

The present invention is not limited in application to rotary mills and it could be applied to any kind of apparatus having a rotary part and requiring a drive means associated therewith. It is especially suitable for apparatus having a massive rotary structure requiring a powerful drive means, as one or more motors.

What is claimed is:

1. In combination: a rotary apparatus having a pair of spaced ends, a central axis through said ends, and means coupled thereto for mounting the ends of the apparatus on a fixed support for rotation about said central axis relative to said support; a wrap-around electric motor coupled with the apparatus and axially spaced from the mounting means for rotating the apparatus, the motor including an annular rotor secured to and surrounding the apparatus for rotation therewith and an annular stator surrounding the rotor and being spaced from the rotor to have a gap therebetween; anti-friction bearing means extending about the apparatus for mounting the stator on the apparatus adjacent to and surrounding the rotor; and means coupled to the stator for coupling the stator to said support to prevent rotation of the stator relative to the rotor as the rotor rotates with the apparatus relative to the support.

2. The combination as set forth in claim 1, wherein the apparatus includes a rotary mill.

3. The combination as set forth in claim 1, wherein the apparatus has a generally cylindrical outer surface, the rotor being coupled to the surface.

4. The combination as set forth in claim 3, wherein is included a torque tube secured to said apparatus and being concentric with said central axis, the rotor being secured to the torque tube and being laterally spaced from the surface.

5. The combination as set forth in claim 4, wherein is included brace means coupled with the apparatus and the torque tube to stiffen the torque tube.

6. The combination as set forth in claim 3, wherein the rotor is secured directly to the cylindrical outer surface.

7. The combination as set forth in claim 1, wherein the bearing means includes means defining an annular bearing surface, and a plurality of rotatable devices in rolling relationship to the bearing surface.

8. The combination as set forth in claim 7, wherein the bearing surface comprises a pair of tracks, the devices including a plurality of pairs of wheels, the wheels of each pair being in rolling engagement with respective tracks.

9. The combination as set forth in claim 8, wherein each wheel has a side flange.

10. The combination as set forth in claim 8, wherein the tracks are coupled to the apparatus, the wheels being coupled with the stator.

11. The combination as set forth in claim 10, wherein the stator has an annular carrier having an outer periphery, a shaft for each pair of wheels, respectively, means rotatably mounting each shaft on the carrier at a respective circumferential location thereon, each pair of wheels being mounted on the respective shaft.

12. The combination as set forth in claim 11, wherein the shaft mounting means includes a number of pairs of spaced, axially aligned sleeves secured to the stator carrier on its outer periphery, each shaft extending through and being rotatable relative to a pair of sleeves.

13. The combination as set forth in claim 8, wherein the tracks and the wheels of each pair are on respective, opposed sides of the rotor and the stator.

14. The combination as set forth in claim 7, wherein each device comprises a cylindrical roller.

15. The combination as set forth in claim 1, wherein the stator coupling means includes a leg having two ends, one end pivotally coupled to the stator and the other end having a resilient anchor, the anchor adapted to be secured to a fixed support.

16. The combination as set forth in claim 1, wherein is included an annular stator carrier secured to and surrounding the stator, the stator carrier having a pair of diametrically opposed lugs thereon, the stator coupling means including a pair of generally rigid legs, means pivotally mounting one end of each leg on a respective lug of the stator carrier, each leg having the anchor on the opposite end thereof, the anchors being resilient and adapted to be secured to said fixed support.

17. The combination as set forth in claim 16, wherein the anchors are yieldable in directions permitting displacements of the stator with the rotor and apparatus while the stator carrier is restrained against rotation about the central axis.

18. For use with a rotary apparatus rotatable about a central axis relative to a fixed support, a wrap-around electric motor including: an annular rotor adapted to be secured to and to surround the apparatus for rotation therewith; an annular stator surrounding the rotor and being spaced from the rotor to present a gap therebetween; anti-friction bearing means adapted to extend about the appartus for mounting the stator on the apparatus adjacent to and surrounding the rotor; and means coupled to the stator for coupling the stator to said support to prevent rotation of the stator relative to the rotor as the rotor rotates with the apparatus relative to the support.

19. A motor as set forth in claim 18, wherein is included a torque tube adapted to be secured to the apparatus and the rotor being secured to the torque tube.

20. A motor as set forth in claim 18, wherein the bearing means includes means defining an annular bearing surface, and a plurality of rotatable devices in rolling relationship to the bearing surface.

21. A motor as set forth in claim 20 wherein the bearing surface comprises a pair of tracks, the devices including a plurality of pairs of wheels, the wheels of each pair being in rolling engagement with respective tracks.

22. A motor as set forth in claim 21, wherein each wheel has a side flange.

23. A motor as set forth in claim 21, wherein the tracks are adapted to be coupled to the apparatus, the wheels being coupled with the stator.

24. A motor as set forth in claim 23, wherein is included an annular carrier having an outer periphery and secured to and surrounding the stator, a shaft for each pair of wheels, respectively, means rotatably mounting each shaft on the carrier at a respective circumferential location thereon, each pair of wheels being mounted on the respective shaft.

25. A motor as set forth in claim 24, wherein the shaft mounting means, includes a pair of spaced, axially aligned sleeves secured to the stator carrier on its outer periphery, each shaft extending through and being rotatable relative to a pair of sleeves.

26. A motor as set forth in claim 21, wherein the tracks and the wheels of each pair are on respective, opposed sides of the rotor and the stator.

27. A motor as set forth in claim 20, wherein each device comprises a cylindrical roller.

28. A motor as set forth in claim 18, wherein the stator coupling means includes a leg with two ends, one end pivotally coupled to the stator and the other end having a resilient anchor, the anchor adapted to be secured to a fixed support.

29. A motor as set forth in claim 18, wherein is included an annular stator carrier secured to and surrounding the stator, the stator carrier having a pair of diametrically opposed lugs thereon, the stator coupling means including a pair of generally rigid legs, means pivotally mounting one end of each leg on a respective lug of the stator carrier, each leg having an anchor on the opposite end thereof, an anchors being resilient and adapted to be secured to said fixed support.

30. A motor as set forth in claim 29, wherein the anchors are yieldable, permitting lateral and radial displacements of the stator with the rotor while the stator is restrained against rotation about the central axis.

* * * * *